United States Patent [19]

Lauw

[11] Patent Number: 5,342,439
[45] Date of Patent: Aug. 30, 1994

[54] BLEED RESISTANCE OF DYES BY COUNTER-ION SUBSTITUTION

[75] Inventor: Hiang P. Lauw, Corvallis, Oreg.

[73] Assignee: Hewlett-Packard Corporation, Palo Alto, Calif.

[21] Appl. No.: 126,468

[22] Filed: Sep. 24, 1993

[51] Int. Cl.$^5$ ............................................. C09D 11/02
[52] U.S. Cl. ................................. 106/22 H; 106/22 K
[58] Field of Search ............................ 106/22 H, 22 K

[56] References Cited

U.S. PATENT DOCUMENTS

| | | | |
|---|---|---|---|
| 4,290,812 | 9/1981 | Loock | 106/22 H |
| 4,761,180 | 8/1988 | Askeland | 106/22 H |
| 4,786,327 | 11/1988 | Wenzel | 106/22 H |
| 4,810,292 | 3/1989 | Palmer et al. | 106/22 B |
| 4,963,189 | 10/1990 | Hindagolla | 106/22 R |
| 5,026,425 | 6/1991 | Hindagolla et al. | 106/22 D |
| 5,098,474 | 3/1992 | Pawlowski et al. | 106/22 H |
| 5,106,416 | 4/1992 | Moffat et al. | 106/22 R |
| 5,116,409 | 5/1992 | Moffatt | 106/22 H |
| 5,196,056 | 3/1993 | Prasad | 106/15.05 |

*Primary Examiner*—Helene Klemanski

[57] ABSTRACT

Color bleed on paper media printed by ink-jet is alleviated by altering the dyes such that they become more bleed resistant. To this end, an organic compound with surfactant properties is substituted as the dye counter-ion. Specifically, a dye having one or more sulfonate or carboxylate groups is provided with a counter-ion comprising an amine having the formula given by $$^+N-(CH_3)_m H_{3-m} - (CH_2)_n - R$$

where m ranges from 1 to 3, n ranges from 3 to 6, and R is a hydrophilic substituent or cycloaliphatic or aromatic group with a hydrophilic substituent. An ink employing the dye of the invention comprises (a) about 0.5 to 40 wt % of one or more low vapor pressure solvents (b) about 0.5 to 5 wt % one or more water-soluble dyes in which one or more of the counter-ions have been substituted with the above amine, and (c) water.

19 Claims, No Drawings

BLEED RESISTANCE OF DYES BY COUNTER-ION SUBSTITUTION

TECHNICAL FIELD

The present invention relates to inks employed in ink-jet printing, especially in thermal ink-jet printing, and, more particularly, to colored ink compositions in which color bleed is substantially reduced or even eliminated.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Recent innovations in thermal ink-jet printing have been directed to providing the capability of color printing. Typically, yellow, magenta, and cyan inks are employed. These three primary colors, when mixed in various combinations, provide a full color palette. Black printing is provided either with a separate black ink or by composite printing of yellow, magenta, and cyan inks.

During printing, a color may require more than one drop of ink at a particular pixel location, either of the same color (to control hue) or of a different color (to provide a specific color). Such multiple drops of ink at one location can provide a heavy dye load on the print medium, or paper.

Heavy dye loads of various colored inks on paper can lead to bleed and reduction of waterfastness. Bleed, as used herein, is the invasion of one color into another color on paper, which is a surface phenomenon. This is in contradistinction to uses of the term in the prior art, which tend to define "bleed" in the context of ink of a single color following the fibers of the paper; this is a sub-surface phenomenon.

Bleed control has been achieved by addition of one or more surfactants; see, e.g., U.S. Pat. No. 5,116,409, issued May 26, 1992, to John Moffatt and assigned to the same assignee as the present application. Alternatively, fast penetrating solvents have been employed to improve bleed resistance; see, e.g., U.S. Pat. No. 5,196,056, issued Mar. 23, 1993, to Keshava Prasad and assigned to the same assignee as the present application.

A need remains for ink compositions for use in ink-jet printing, particularly thermal ink-jet printing, which do not evidence bleed, as defined herein, and yet which possess relatively long shelf life and other desirable properties of such inks.

DISCLOSURE OF INVENTION

In accordance with the invention, color bleed on paper media printed by ink-jet is alleviated by altering the dyes such that they become more bleed resistant. To this end, an organic compound with surfactant properties is substituted as the dye counter-ion. Specifically, a dye having one or more sulfonate or carboxylate groups is provided with a counter-ion comprising an amine having the formula given by

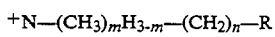

where m ranges from 1 to 3, n ranges from 3 to 6, and R is a hydrophilic substituent or cycloaliphatic or aromatic group with the hydrophilic substituent.

An ink employing the dye of the invention comprises (a) about 0.5 to 40 wt % of one or more low vapor pressure solvents (b) about 0.1 to 8 wt % one or more water-soluble dyes in which one or more of the counter-ions have been substituted with the above amine, and (c) water.

As used herein, the term "low vapor pressure solvent" refers to a solvent having a vapor pressure that is lower than that of water and the term "water-soluble dye" refers to a dye whose solubility in water exceeds 2 wt %.

Bleed resistance of inks employing the substituted dyes of the invention is better and less paper-dependent than that of ink containing unsubstituted dyes.

BEST MODES FOR CARRYING OUT THE INVENTION

In the practice of the invention, color bleed resulting from the use of ink-jet inks in thermal ink-jet printers is alleviated by altering the dyes such that they become more bleed resistant. To this end, an organic compound with surfactant properties is substituted as the dye counter-ion, employing any of the common cation exchange techniques, such as use of an ion exchange column, as disclosed in U.S. Pat. No. 4,786,327, issued Nov. 22, 1988, and assigned to the same assignee as the present application.

The class of organic compounds with surfactant properties is defined herein as an amine with a short alkyl chain having solubilizing groups on the other end. Examples of suitable solubilizing groups include amines and alcohols. If the solubilizing group is absent, the dye will not be water soluble and will therefore precipitate in a water-based ink.

The length of the alkyl chain ranges from three to six carbon atoms. An amine with less than three carbon atoms does not provide enough hydrophobicity to the substituted dye to prevent bleed, while an amine with more than six carbon atoms forms a water-insoluble compound with the dye, even with the presence of the solubilizing group.

Any of the amines falling within the definition given above may be employed in the practice of the invention, so long as the amine can function as a cation. The formula of amines is given by

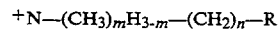

where m ranges from 1 to 3, n ranges from 3 to 6, and R is a hydrophilic substituent or cycloaliphatic or aromatic group with a hydrophilic substituent. Specifically, R can be —OH or —NH$_2$ or a five- or six-membered heterocyclic aliphatic or aromatic ring with the hydrophilic substituent attached to the ring or including a functionality that may be protonated to form the hydrophilic substituent. For example, R can be a lactam, which is a heterocyclic aliphatic group with a nitrogen atom in the ring and a ester oxygen attached to the ring. Either the nitrogen or the oxygen may be protonated to form the —OH or —NH$_2$ hydrophilic substituent.

Examples of amines employed in the practice of the invention include dimethylaminopropylamine (DMAP) and dimethylaminopropyl-2-pyrrolidone (DMAPP). In the case of DMAP, m=2, n=3, and R is —NH$_2$. The formula is given by

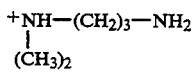

In the case of DMAPP, m=2, n=3, and R is 2-pyrrolidone, a five membered heterocyclic ring (C$_4$H$_3$O—N—), in which attachment is through the nitrogen. The formula is given by

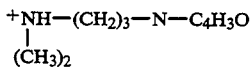

Both of the foregoing compounds are bases, and will form salts with acids.

All concentrations herein are in weight percent, unless otherwise indicated. The purity of all components is that employed in normal commercial practice for thermal ink-jet inks.

The preparation of dyes having substituted thereon an amine as described above is easily accomplished, using ion exchange processes such as described above. The typical dye employed in thermal ink-jet printing has from one to six sulfonate groups. As purchased, these dyes have sodium counter-ions associated with the sulfonate groups or carboxylate groups, as the case may be.

The ion exchange process replaces one or more of these sodium counter-ions. Preferably, all of the sodium (or other) counter-ions associated with the dye molecule are replaced with the amine cation described herein. It will be appreciated that it may take a number of passes through an ion exchange column to replace all (or substantially all) of the counter-ions with the amine cations of the invention. Thus, a "fully" substituted dye molecule may not indeed be totally substituted, but for the purposes of this invention, is considered to be so. The "fully" substituted dye may be blended with non-substituted dye, containing sodium counter-ions, in order to control kogation and bleed properties of the thermal ink-jet ink. Sodium counter-ions, while tending to create crusting problems, are often the best counter-ions for reducing kogation (residue on thermal resistors), depending on the ink vehicle. The total amount of sodium-containing dye will, of course, depend on balancing the tendency towards bleed and crusting (dictating a lower amount of the sodium-containing dye) and kogation (dictating a higher amount of the sodium-containing dye).

It will be appreciated that substituting a sodium counter-ion with an amine counter-ion by ion exchange results in an ink that behaves considerably different than merely adding the amine cation to the ink.

Dyes substituted in accordance with the invention include, but are not limited to, anionic water-soluble types such as C.I. Acid Blue 9 (#42090), C.I. Acid Red 18 (#18), C.I. Acid Red 27 (#16185), C.I. Acid Red 52 (#45100), C.I. Acid Red 289 (#45110), C.I. Acid Yellow 23 (#19140), C.I. Direct Blue 199 (#74190), C.I. Direct Yellow 86 (#29325), and Reactive Red 180. Also, carboxylated dyes, such as disclosed in U.S. Pat. No. 4,963,189, issued Oct. 16, 1990, to Suraj Hindagolla and assigned to the same assignee as the present application, may also be employed in the practice of the invention.

The ink comprises one or more dyes substituted with the amine, optionally blended with one or more dyes having sodium cations associated with the functional groups. The dye(s) is present from about 0.1 to 8 wt % of the ink.

The ink also includes at least one low vapor pressure solvent and water. The total concentration of the low vapor pressure solvent(s) ranges from about 0.5 to 40 wt % of the ink, and preferably from about 5 to 25 wt %. Other components commonly associated with thermal ink-jet inks, including biocides, anti-kogating agents, and surfactants, may also be present.

Low vapor pressure solvents can include, but are not limited to, glycols such as ethylene glycol, diethylene glycol, triethylene glycol, tetraethylene glycol, propylene glycol, polyethylene glycol, polypropylene glycol, thiodiglycol, and derivatives thereof; diols such as butanediol, pentanediol, hexanediol, methylpropanediol, cyclohexanediol, and homologous diols; glycol esters such as propylene glycol laurate; mono and di glycol ethers such as Cellosolves, including ethylene glycol monobutyl ether, diethylene glycol ethers such as the Carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, esters, ketones, lactones such as γ-butyrolactone, lactams such as 2-pyrrolidone, N-pyrrolidone and N-(2-hydroxyethyl)pyrrolidone, and polyhydroxyalcohols, such as sorbitol, mannitol, glycerol, and myoinositol, and derivatives thereof.

Preferably, the low vapor pressure solvent comprises at least one solvent selected from the group consisting of 1,5-pentanediol, methylpropanediol, 2-pyrrolidone, thiodiglycol, cyclohexanedio and sorbitol.

Inks are formulated by mixing the amine-substituted dye and sodium-containing dye (if used) with one or more low vapor pressure solvents and water.

In one example of a preferred ink of the present invention, the composition consists essentially of (a) about 20 wt % 1,5-pentanediol, (b) about 1.5 wt % N,N-dimethyl-N-dodecyl amine oxide (NDAO), (c) a dye selected from the group consisting of Acid Yellow 23, Acid Blue 9, and Acid Red 289 having associated therewith cations consisting essentially of dimethylaminopropylamine, and (d) the balance water.

Another example of a preferred ink of the present invention consists essentially of (a) about 15 to 25 wt % of a solvent blend comprising at least two low vapor pressure solvents selected from the group consisting of 1,5-pentanediol, 2-pyrrolidone, thiodiglycol, methylpropanediol, cyclohexanediol, and sorbitol, (b) about 2 to 6 wt % of a substituted carboxylated dye, (c) a surfactant selected from the group consisting of NDAO, N,N-dimethyl-N-(Z-9-octadecenyl)-N-amine oxide (OOAO) and the TRITONS, which are nonyl phenyl polyethylene oxide surfactants available from Rohm & Haas Co., generally represented as:

$$R-Ph-O(CH_2-CH_2-O)_y R'$$

where R, R' is any alkane, alkene, aryl or alkynyl group or H, Ph is phenyl, y=1 to 50, and R is para to the ether linkage on the benzene ring, and (d) the balance water.

Yet another example of a preferred ink of the present invention consists essentially of (a) about 5 to 20 wt % methylpropanediol, (b) 0 to about 1.5 wt % NDAO, (c) a dye selected from the group consisting of Acid Yellow 23, Acid Blue 9, and Acid Red 52 having associated therewith cations consisting essentially of dimethylaminopropyl-2-pyrrolidone, and (d) the balance water.

EXAMPLES

Example 1

Inks were prepared comprising a dye and comprising a vehicle. The vehicle comprises 20 wt % 1,5-pentane diol, 1.5 wt % N,N-dimethyl-N-dodecyl amine oxide surfactant (the use of this compound is disclosed and claimed in U.S. Pat. No. 5,106,416, issued Apr. 21, 1992, and assigned to the same assignee as the present application), and the balance water. The following dyes were "fully" substituted with DMAP: Acid Yellow 23, Acid Blue 9, and Acid Red 289. The yellow ink contained an amount of the substituted dye to provide an absorbance of 0.1, the cyan ink contained an amount of the substituted dye to provide an absorbance of 0.25, and the magenta ink contained an amount of the substituted dye to provide an absorbance of 0.2, all measured at a 1:10,000 dilution in water. The absorbance (in absorbance units, au) is a function of the dye concentration (wt %), the molecular weight of the dye, and the molar extinction coefficient. For these dyes, an absorbance of 0.1 for Acid Yellow 23 at 1:10,000 dilution is equivalent to a concentration of about 0.9 to 1.1 wt %; an absorbance of 0.25 for Acid Blue 9 at 1:10,000 dilution is equivalent to a concentration of about 1.8 to 2.0 wt %; and an absorbance of 0.2 for Acid Red 289/Acid Red 52 at 1:10,000 dilution is equivalent to a concentration of about 1.3 to 1.5 wt %;

Comparative Example 2

For comparison, inks were made employing the vehicle of Example 1. The dye set comprised Acid Blue 9 and Acid Red 289, both with sodium counter-ions, and Acid Yellow 23, in which the counter-ion was tetramethylammonium, as disclosed and claimed in U.S. Pat. No. 4,761,180, issued Aug. 2, 1988, and assigned to the same assignee as the present application. The yellow ink contained an amount of the dye to provide an absorbance of 0.1, the cyan ink contained an amount of the dye to provide an absorbance of 0.25, and the magenta ink contained an amount of the dye to provide an absorbance of 0.2.

Example 3 - Results

Both sets of inks were printed on photocopy paper (Hammermill) and on bond paper (Gilbert Bond). In both cases, a standard pattern of printing, to provide a full palette of colors, including composite black, was printed.

The inks containing the dyes of the invention visually showed improved bleed control between colors, which was substantially independent of paper type. The bleed between colors using inks containing the dyes of the invention was less than that obtained by printing with the comparative set of prior art inks.

INDUSTRIAL APPLICABILITY

The inks of the invention are expected to find use in thermal ink-jet printers employing color inks.

Thus, there have been disclosed dyes having substituted thereon amines provided with a solubilizing portion for improving bleed resistance in color dyes. It will be readily apparent to those skilled in this art that various changes and modifications of an obvious nature may be made, and all such changes and modifications are considered to fall within the scope of the invention.

What is claimed is:

1. A thermal ink-jet ink comprising:
   (a) about 0.5 to 40 wt % of a low vapor pressure solvent;
   (b) about 0.1 to 8 wt % of a sulfonate or carboxylate dye provided with an amine-containing counter-ion having a formula given by $$^+N-(CH_3)_m H_{3-m}-(CH_2)_n-R$$

where m ranges from 1 to 3, n ranges from 3 to 6, and R is a hydrophilic substituent or cycloaliphatic or aromatic group with a hydrophilic substituent, said amine-containing counter-ion replacing any cation previously associated with said dye; and
   (c) water.

2. The thermal ink-jet ink of claim 1 wherein R is —OH or —NH$_2$.

3. The thermal ink-jet ink of claim 1 wherein R is a five- or six-membered heterocyclic aliphatic or aromatic ring with an —OH or —NH$_2$ group attached to the ring or including a functionality that may be protonated to form said —OH or —NH$_2$ group.

4. The thermal ink-jet ink of claim 1 wherein said amine-containing counter-ion is selected from the group consisting of dimethylaminopropylamine and dimethylaminopropyl-2-pyrrolidone.

5. The thermal ink-jet ink of claim 1 wherein said low vapor pressure solvent ranges from about 5 to 25 wt %.

6. The thermal ink-jet ink of claim 1 wherein said low vapor pressure solvent is selected from the group consisting of glycols and derivatives thereof; diols; glycol esters; mono and di glycol ethers; long chain alcohols; sulfolane; esters; ketones; lactones; lactams; and polyhydroxyalcohols, and their derivatives.

7. The thermal ink-jet ink of claim 5 wherein said low vapor pressure solvent is selected from the group consisting of ethylene glycol, diethylene glycol, triethylene glycol, tetraethylene glycol, propylene glycol, polyethylene glycol, polypropylene glycol, thiodiglycol, and derivatives thereof; butanediol, pentanediol, hexanediol, methylpropanediol, cyclohexanediol, and homologous diols; propylene glycol laurate; ethylene glycol, monomethyl ether, ethylene glycol monobutyl ether, diethylene glycol ethers, diethylene glycol monoethyl ether, diethylene glycol monobutyl ether, diethylene glycol monohexyl ether, propylene glycol ether, dipropylene glycol ether, and triethylene glycol ether; butyl alcohol, pentyl alcohol, and homologous alcohols; γ-butyrolactone; 2-pyrrolidone, N-pyrrolidone and N-(2-hydroxyethyl)pyrrolidone; and sorbitol, mannitol, glycerol, and myoinositol.

8. The thermal ink-jet ink of claim 7 wherein said low vapor pressure solvent is selected from the group consisting of 1,5-pentanediol, methylpropanediol, 2-pyrrolidone, thiodiglycol, cyclohexanediol, and sorbitol.

9. The thermal ink-jet ink of claim 1 wherein said ink consists essentially of about 20 wt % 1,5-pentanediol, about 1.5 wt % N,N-dimethyl-N-dodecyl amine oxide, a dye selected from the group consisting of Acid Yellow 23, Acid Blue 9, and Acid Red 289 having associated therewith cations consisting essentially of dimethylaminopropylamine, and the balance water.

10. The thermal ink-jet ink of claim 1 wherein said ink consists essentially of (a) about 15 to 25 wt % of a solvent blend comprising at least two low vapor pressure solvents selected from the group consisting of 1,5-pentanediol, 2-pyrrolidone, thiodiglycol, methylpropanediol, cyclohexanediol, and sorbitol, (b) about 2 to 6 wt % of a carboxylated dye having associated therewith cations selected from the group consisting of dimethylaminopropylamine and dimethylaminopropyl-2-pyrrolidone, (c) a surfactant selected from the group consisting of N,N-dimethyl-N-dodecyl amine oxide, N,N-dimethyl-N-(Z-9-octadecenyl)-N-amine oxide, and nonyl phenyl polyethylene oxides, and (d) the balance water.

11. The thermal ink-jet ink of claim 1 wherein said ink consists essentially of (a) about 5 to 20 wt % methylpropanediol, (b) 0 to about 1.5 wt % N,N-dimethyl-N-dodecyl amine oxide, (c) a dye selected from the group consisting of Acid Yellow 23, Acid Blue 9, and Acid Red 52 having associated therewith cations consisting essentially of dimethylaminopropyl-2-pyrrolidone, and (d) the balance water.

12. A method of reducing bleed between color inks in a thermal ink-jet printer, comprising formulating said ink by blending together the following components:
(a) about 0.5 to 40 wt % of a low vapor pressure solvent;
(b) about 0.1 to 8 wt % of a sulfonate or carboxylate dye provided with an amine-containing counter-ion having a formula given by

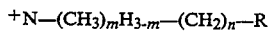

where m ranges from 1 to 3, n ranges from 3 to 6, and R is a hydrophilic substituent or cycloaliphatic or aromatic group with a hydrophilic substituent, said amine-containing counter-ion replacing any cation previously associated with said dye; and
(c) water.

13. The method of claim 12 wherein R is —OH or —NH$_2$.

14. The method of claim 12 wherein R is a five- or six-membered heterocyclic aliphatic or aromatic ring with an —OH or —NH$_2$ group attached to the ring or including a functionality that may be protonated to form said —OH or —NH$_2$ group.

15. The method of claim 12 wherein said amine-containing counter-ion is selected from the group consisting of dimethylaminopropylamine and dimethylaminopropyl-2-pyrrolidone.

16. The method of claim 12 wherein said low vapor pressure solvent ranges from about 5 to 25 wt %.

17. The method of claim 12 wherein said low vapor pressure solvent is selected from the group consisting of glycols and derivatives thereof; diols; glycol esters; mono and di glycol ethers; long chain alcohols; sulfolane; esters; ketones; lactones; lactams; polyhydroxyalcohols, and their derivatives.

18. The method of claim 17 wherein said low vapor pressure solvent is selected from the group consisting of ethylene glycol, diethylene glycol, triethylene glycol, tetraethylene glycol, propylene glycol, polyethylene glycol, polypropylene glycol, thiodialycol, and derivatives thereof; butane-diol, pentanediol, hexanediol, methylpropanediol, cyclohexanediol, and homologous diols; propylene glycol laurate; ethylene glycol monomethyl ether, ethylene glycol monobutyl ether, diethylene glycol ethers, diethylene glycol monoethyl ether, diethylene glycol monobutyl ether, diethylene glycol monohexyl ether, propylene glycol ether, dipropylene glycol ether, and triethylene glycol ether; butyl alcohol, pentyl alcohol, and homologous alcohols; γ-butyrolactone; N-pyrrolidone and N-(2-hydroxyethyl)pyrrolidone; and sorbitol, mannitol, glycerol, and myoinositol.

19. The method of claim 18 wherein said low vapor pressure solvent is selected from the group consisting of 1,5-pentane diol, methylpropanediol, 2-pyrrolidone, thiodiglycol, cyclohexanediol, and sorbitol.

* * * * *